United States Patent [19]
Nordbye

[11] 3,936,957
[45] Feb. 10, 1976

[54] DEMOTIC GEMSTONE INDICATING DEVICE

[76] Inventor: Robert B. Nordbye, 14297 - 102nd Ave., N., Largo, Fla. 33540

[22] Filed: July 17, 1974

[21] Appl. No.: 489,445

[52] U.S. Cl. .................................. 35/74; 40/70 R
[51] Int. Cl.² ........................................ G09B 19/00
[58] Field of Search ............ 35/44, 43, 74, 54, 55, 35/53, 1, 7 R, 7 A; 40/70 R, 70 A; 273/161

[56] References Cited
UNITED STATES PATENTS

| | | | |
|---|---|---|---|
| 573,091 | 12/1896 | Lindahl | 35/44 |
| 1,171,458 | 2/1916 | Phillips | 35/44 |
| 1,506,338 | 8/1924 | Drown | 273/161 |
| 1,594,675 | 8/1926 | Kuhlman | 273/161 X |
| 1,676,410 | 7/1928 | Paul | 35/74 |
| 1,709,849 | 4/1929 | Hazel | 35/74 X |
| 1,709,937 | 4/1929 | Everard | 35/53 X |
| 2,315,316 | 3/1943 | Cissna | 35/44 |
| 2,518,664 | 8/1950 | Chern | 35/44 |
| 3,423,847 | 1/1969 | Barbee | 35/74 X |
| 3,751,830 | 8/1973 | Brynjegard | 35/44 |

*Primary Examiner*—Wm. H. Grieb

[57] ABSTRACT

A mechanical device in the form of a circular slide rule of which a circular portion and two arms rotate around a common axis on a fixed rectangular base plate. Said circular portion displays information through six horizontal apertures which is revealed from the rectangular base plate. Two arms rotating from the common axis atop the circular portion contain three apertures through which information is displayed from the circular portion. The device has an adjustable input in the form of precise birth data, and an output portion revealing a plurality of factors in gemstones, Biblical data, historical and symbolic data directly related to, and associated with, time of birth factors.

8 Claims, 3 Drawing Figures

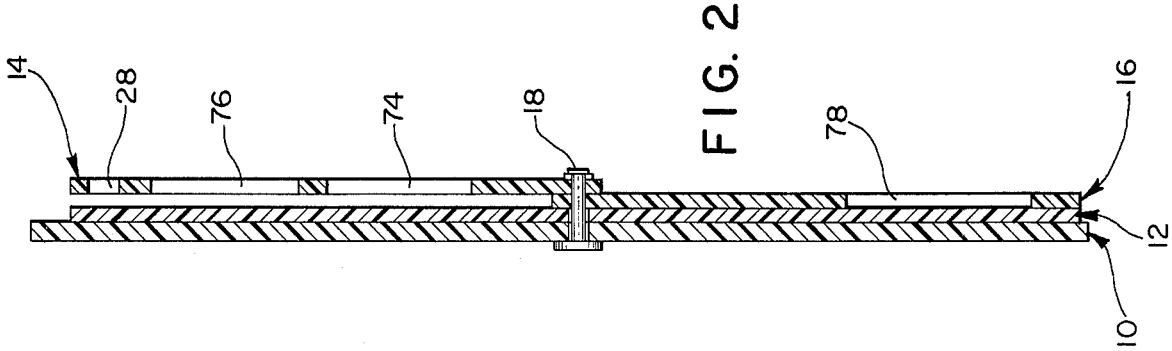
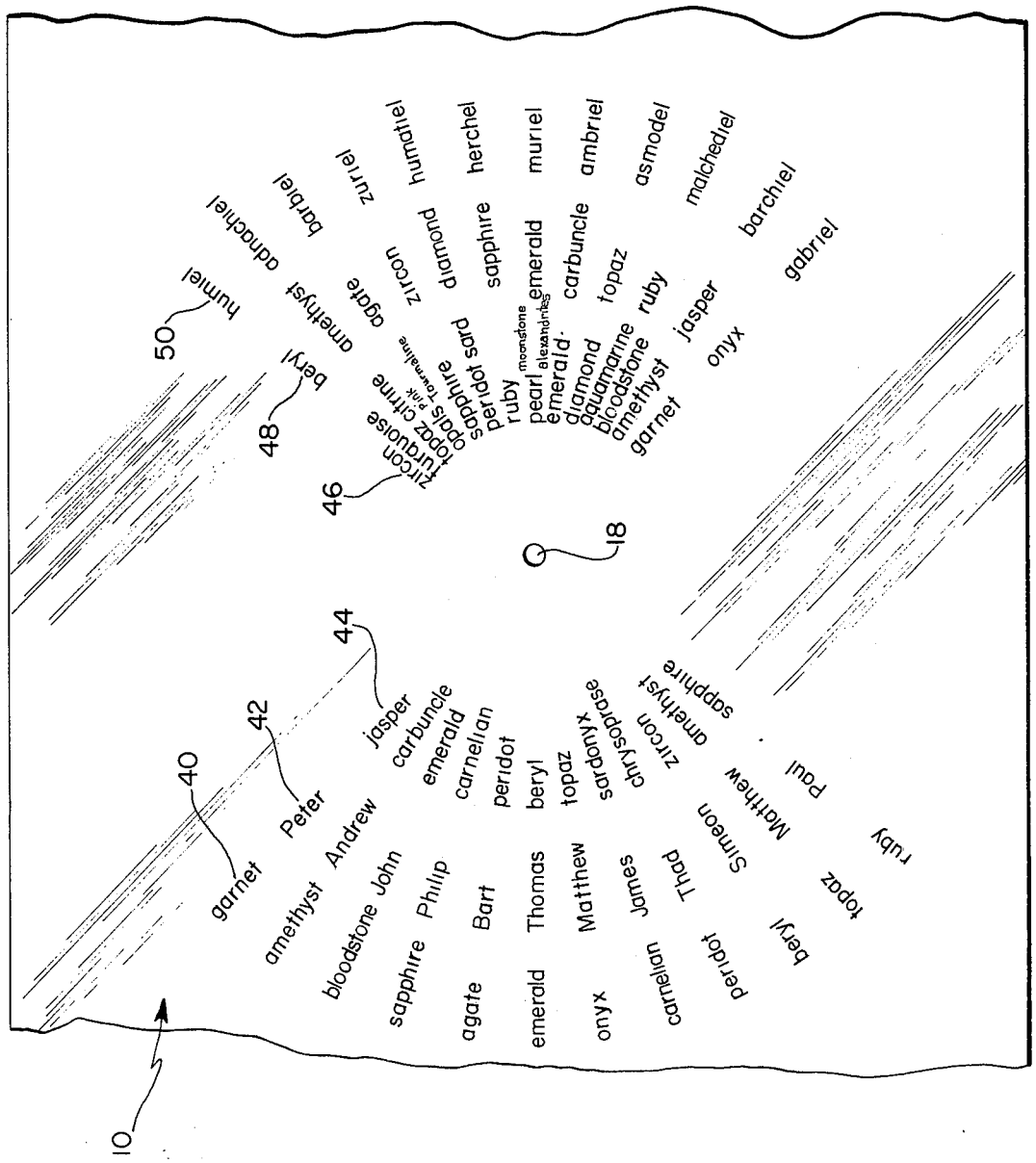

3,936,957

DEMOTIC GEMSTONE INDICATING DEVICE

BACKGROUND OF THE INVENTION

Throughout history it has been customary for people to wear various adornments, often for superstitious or religious purposes such as warding off evil spirits or protecting oneself against sickness or disease. Often such adornments were worn to bring good luck and fortune, or to indicate status and wealth, or as means of identification. At the present time a tremendous amount of jewelry is manufactured for an infinite number of reasons often known only to the person who buys and wears it.

While more recent history of the wearing of certain types of adornments is somewhat obscure, the initial wearing of birthstones is considered to have begun sometime around the 16th Century A.D., and is believed to be based on an early use of stones for identifying a specific nation or nationality, as in the origin of the breastplate. Early lore indicates that the breastplate was constructed with 12 gemstones, each engraved with the name of one of the 12 tribes of Israel, from which foundation stones are believed to have been evolved. Thus, each of the 12 stones was associated with the name of one of the 12 Apostles. From the origin of the foundation stones until today, little has changed in the birthstone concept. In addition to the 12 Apostles, gemstones have been associated with the 12 guardian angels and with the signs of the zodiac. Additionally, the days of the week, hours of the day and the four seasons have been associated with gemstones and adapted to the life of man. So, throughout history gemstones have become associated with the origin of a person and more specifically with the time of birth of the person. However, because of the vast number of stones and factors involved in the origin of people, it has been difficult to assemble such information into a readily usable form.

The basic birth information normally provided includes the person's month of birth, zodiac date or sign, day of the week of birth, and the hour of birth, from which the season of the year of birth is known. The Gemological Institute of America lists 43 gemstones associated with the foregoing time of birth factors, as well as variations in color, and so forth, of the stones.

The device provides a unique system for determining from various factors of a person's time of birth his personal genetic background in symbolic gemstones, such as in the form of an adornment. The 43 different gems involved in this system provide an almost endless choice of gemstones that can be worn by the person in terms of what might be called "Life stones". The device provides 14 basic pieces of information regarding a person's Biblical and tribal background, Zodiac data and thousands of different gemstone and symbolic combinations with 48 items of genetic data regarding birth and heritage. Thus, when the device is utilized with regard to the jewelry trade, a unique adornment may be customized for the individual. As used herein "Demotic" means "Science of life".

The invention, in brief, is directed to a device having sections in the form of an input portion adjustable to selected input settings designating particular birth data, and an output portion adjustable to output setting upon adjustment of the input portion to the selected input setting, for designating symbolic data and gemstones associated with the designated birth data. While the device may be of any suitable type such as electrical or electronic, in the illustrated embodiment it is mechanical with the input and output sections including parts mounted for relative movement, the parts including a first part having time of birth designations and symbolic designations, and a second part having indicators including a first indicator designating a particular time of birth designation, and a second indicator designating an associated symbolic designation. Pairs of these parts cooperate with each other and each pair includes one of the aforesaid first and second parts. In the illustrated embodiment the pairs are in the form of a circular slide rule, each of the parts being mounted for rotation about a common axis.

It is a primary object of this invention to provide a new and useful device including an input portion adjustable to selected input position designating particular birth data, and an output portion adjustable to output positions responsive to the adjustment of the input portion, the resultant output position designating data symbolic of the designated birth data. A related object is provision of the birth data in a form including factors of the time of birth and the symbolic data including designations of symbols and gemstones, one associated with each of the time of birth factors. A related object is provision of the input portion comprising sections adjustable relative to each other to a selected input position and responsive thereto the output portion including sections adjusted relative to each other to the resultant output position. Still another related object is provision of the input and output sections in the form of parts mounted for movement relative to each other to a selected input position, the parts including a first part having time of birth designations and symbolic designations, and a second part having indicators including a first indicator designating a particular time of birth designation and a second indicator designating a symbolic designation. A still further related object is provision of pairs of said parts, each pair including one of the aforesaid first and second parts, the pairs being mounted in the form of a circular slide rule.

These and other objects and advantages of the invention will be apparent from the following description and the accompanying drawings.

BRIEF DESCRIPTION OF THE DRAWINGS

FIG. 2 is a sectional view taken generally along the stepped section line 2—2 in FIG. 1; and FIG. 3 is a facial view of a part shown in FIG. 1, but removed from the device, and with ends broken away.

DESCRIPTION OF THE ILLUSTRATED EMBODIMENT

Figure 1:
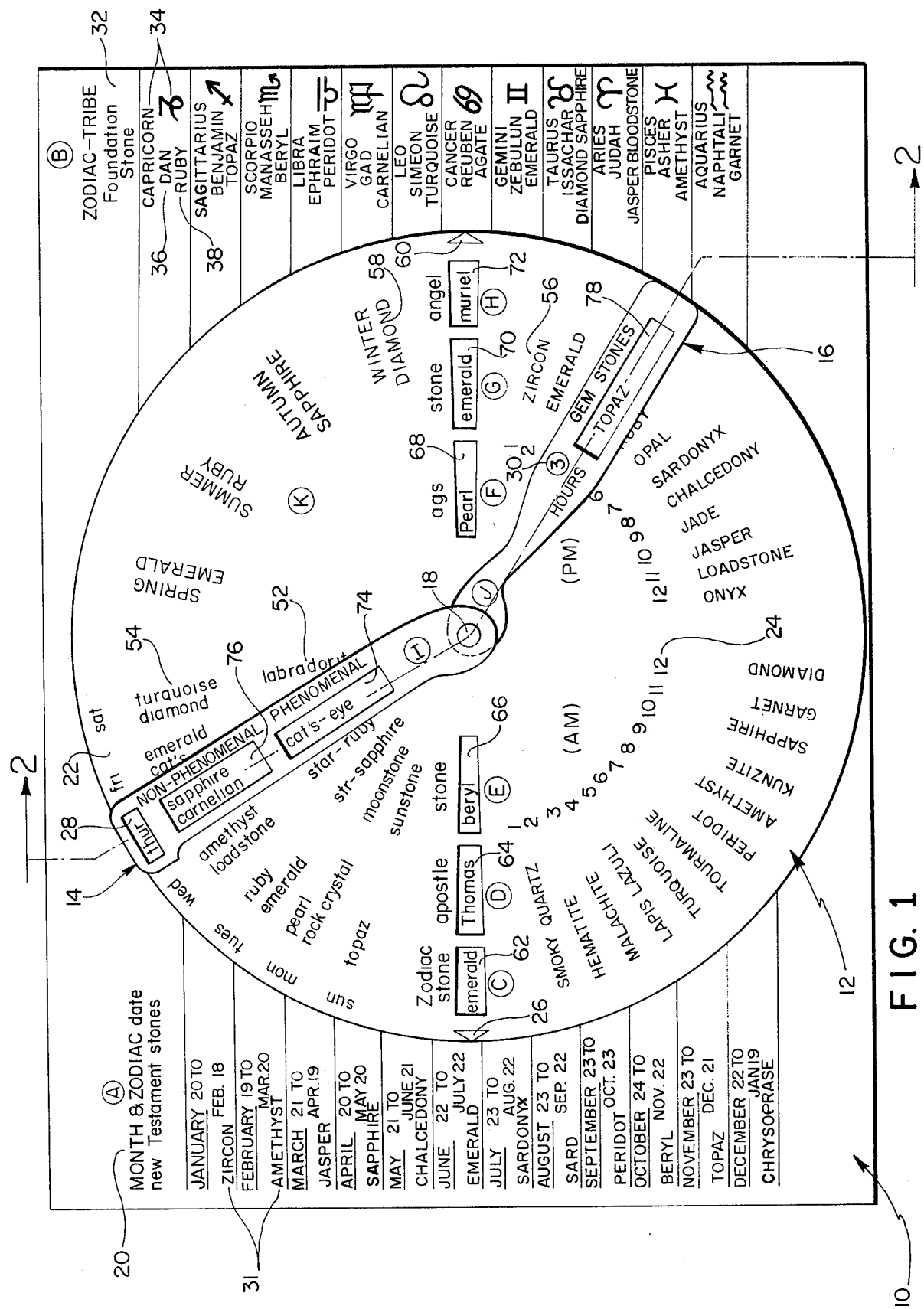
FIG. 1 is a facial view of a preferred embodiment of the invention.

Referring to FIG. 1 of the drawing, the demotic gemstone indicating device is illustrated in the form of a circular slide rule having a rectangular base 10, a disc 12, and a pair of arms 14 and 16 mounted on a pivot pin 18 for rotation about a common axis.

Input data for the device is in the form of birth data and includes a vertical column 20 along the left-hand margin of the rectangular base 10, and designated "A" on the device. Column 20 lists the 12 months of the year and the Zodiac dates. The input data further includes an arched column along a peripheral portion of the disc 12 designating the names of the 7 days of the week; and a second arched column 24 approximately midway between the periphery of the disc and the pivot pin 18, the column 24 designating the hours of the day from one to 12 A.M. and from one to 12 P.M. of the hour of birth. As shown in FIG. 1 horizontal lines separate each of the month and Zodiac date designations, and a triangularly shaped arrowhead 26 along the peripheral portion of the disc 12 is aligned with the appropriate one of the month and Zodiac date designations and New Testament stones. An indicator window 28 in the arm 14 is positioned over the appropriate day designation in the column 22, and as illustrated over the designation for "Thursday", and circular indicator window 30 in the arm 16 is positioned over the appropriate hour designation, illustrated as three o'clock P.M. Thus, the factors of the input data have been set on the slide rule, and include the month and Zodiac date of birth designation in column 20, as indicated by the arrowhead 26 on the disc; the day of birth designation in column 22 as indicated by the window 28 in the arm 14; and the hour of birth designation in column 24, as indicated by the window 30 in the arm 16. Because Zodiac dates run from one mid-month to the next, one additional input movement may be necessary to establish the Zodiac sign and Zodiac gemstone. Example: In FIG. 1, arrow 26 is set on the data range of June 22 to July 22, indicating the Zodiac gemstone as emerald in window 62 and Cancer for the Zodiac sign opposite arrow 60 in column 32. If however, the actual birthdate was June 5, then arrow 26 on disc 12 must be moved clockwise to the data range of June 5, which would automatically and correctly adjust window 62 to indicate agate for the Zodiac gemstone and arrow 60 on disc 12 to the Zodiac sign of Gemini in column 32. If on the other hand, the birth data was July 27, then arrow 26 must be moved counterclockwise to the July 27 date range indicating onyx for the Zodiac gemstone in window 62 and Leo for the Zodiac sign in column 32.

Once this additional movement has been accomplished and the Zodiac sign and gemstone have been established, arrow 26 is then returned to the month of birth and all data, other than the Zodiac sign and Zodiac gemstone (which has already been established by previous movement when necessary) is then read as constant and correct without further movements. It should be noted that the exact birth date range and month of birth may correspond on the initial setting of pointer 26 to the month, in which case no additional movements of pointer 26 are required to get correct readings.

An output portion of the device includes symbolic output data which is herein illustrated in the form of historical, religious astrological and gemstone symbols. Designations of this symbolic data are found in column 20 in the form of New Testament stone designations, as 31; a column 32, designated as column "B" along the right hand marginal portion of the rectangular base 10, such designations including the Zodiac sign and name, as 34, the ancient tribe name, as 36, and the foundation gemstone name as 38. Additional output designations found on the rectangular base 10 are shown in FIG. 3 in the form of circular sector columns including a Zodiac gemstone column 40, an Apostle name column 42, an Apostle gemstone column 44, a birthstone or "ags" (American Gem Society) gemstone column 46, a guardian angel gemstone column 48, and a guardian angel name column 50. Other output data designations are found on the disc 12 (FIG. 1) and again include circular segment columns including a day of birth column 52 of phenomenal gemstones (a phenomenal stone is one in which light floats or in which there is an asterisk effect) and a column 54 of non-phenomenal gemstones; and a column 56 designating the gemstones associated with each hour of birth. Additionally, the disc 12 carries a column 58 indicated by letter "K" designating gemstones for each of the four seasons of the year.

Indicators for designating the appropriate output data symbols are found on the disc 12 and the two arms 14 and 16. More particularly, the disc 12 carries a triangularly shaped arrowhead 60 along its peripheral portion and this arrowhead is automatically aligned with the associated Zodiac sign and ancient tribe and foundation gemstone designation as bracketed by horizontal lines in column 32, upon alignment of the arrowhead 26 with the appropriate Zodiac date designation in column 20. Additionally, the disc 12 has a window 62, indicated by the letter "C", to indicate the appropriate Zodiac stone designation of column 40 (FIG. 3).

The disc 12 also has a window 64, designated by the letter "D", to indicate the appropriate Apostle name designation in column 42 (FIG. 3); a window 66, indicated by the letter "E", to indicate the appropriate Apostle gemstone designation in column 44 (FIG. 3); a window 68, indicated by the letter "F", to indicate the appropriate ags or birth-stone designation of column 46 (FIG. 3); a window 70, designated by the letter "G", to indicate the appropriate guardian angel gemstone designation of column 48 (FIG. 3); and a window 72, indicated by the letter "H", to indicate the guardian angel name designation of column 50 (FIG. 3). The arm 14 indicated by the letter "I", carries indicators in the form of a window 74 to indicate the phenomenal gemstone designation of column 52 on the disc; and an indicator window 76 to indicate the nonphenomenal gemstone designation of column 54 associated with the day of birth designation on the disc, as indicated by the indicator window 28 of the arm 14. Finally, the arm 16, indicated by the letter "J", has a window 78 to indicate the hour of birth gemstone designation in column 56 on the disc.

While this invention has been described with reference to a particular embodiment in a particular environment, various changes may be apparent to one skilled in the art and the invention is not to be limited to such embodiment or environment except as set forth in the appended claims.

What is claimed is:

1. A gemstone indicating device comprising:
   a base having a first set of input data designating specific birth information and a first set of symbolic output data related to said birth information;
   a disc rotatably mounted on said base above said output data, said disc having an indicator thereon whereby said disc may be adjustable to input settings selecting one of said first input data;
   a plurality of apertures in said disc overlying said first set of output data on said base, whereby said apertures will designate certain of said output data which are related to said selected input data;
   said disc further having a second set of input data designating additional birth information and a second set of symbolic output data related to said additional birth information;
   and a pair of adjustable arms pivotally mounted on said base above said disc, each of said arms having a plurality of first and second apertures therein, said first apertures selecting certain of said second input data and said second apertures designating certain of said second output data which is related to said selected second input data.

2. A device as set forth in claim 1 in which said input data is adjustable to the month, the Zodiac date range of birth, the day of the week and hour of birth.

3. A device as set forth in claim 1 in which said birth data comprises a plurality of factors of the time of birth and the symbolic data comprises designations of symbols and gemstones, one associated with each of said factors.

4. A device as set forth in claim 3 in which gemstones are associated with the month, the Zodiac date range, day of the week, hour of the day and season of the year.

5. A device as set forth in claim 3 in which said symbols include a religious symbol and associated gemstone.

6. A device as set forth in claim 3 in which said symbols include an astrological symbol and associated gemstone.

7. A device as set forth in claim 3 in which said symbols include a historical symbol and associated gemstone.

8. A device as set forth in claim 1 in which said apertures designate religious, historical, astrological symbols including Biblical, Apostle, guardian angel, ancient tribes, Zodiac names, foundation gemstones, New Testament gemstones and birthstones; and phenomenal and non-phenomenal gemstones corresponding to the day of the week, and a gemstone corresponding to the hour of birth, and a gemstone corresponding to the season of birth.

* * * * *